United States Patent [19]

Graham

[11] Patent Number: 5,502,482
[45] Date of Patent: Mar. 26, 1996

[54] DERIVATION OF STUDIO CAMERA POSITION AND MOTION FROM THE CAMERA IMAGE

[75] Inventor: Alexander T. Graham, Broad Oak Heathfield, United Kingdom

[73] Assignee: British Broadcasting Corporation, London, United Kingdom

[21] Appl. No.: 211,779

[22] PCT Filed: Aug. 12, 1993

[86] PCT No.: PCT/GB93/01715

§ 371 Date: Apr. 15, 1994

§ 102(e) Date: Apr. 15, 1994

[87] PCT Pub. No.: WO94/05118

PCT Pub. Date: Mar. 3, 1994

[30] Foreign Application Priority Data

Aug. 12, 1992 [GB] United Kingdom .................. 9217098

[51] Int. Cl.$^6$ .................................................. H04N 7/18
[52] U.S. Cl. .......................... 348/140; 348/25; 348/700; 348/703
[58] Field of Search .................................. 348/699–703, 348/135, 169, 592, 27, 25, 32, 137, 140, 581, 650, 17, 348, 165; 382/286, 289

[56] References Cited

U.S. PATENT DOCUMENTS 4,227,212  10/1980  Woolfson et al. .

(List continued on next page.)

FOREIGN PATENT DOCUMENTS

| 0236519A1 | 9/1987 | European Pat. Off. . |
| 0360698A1 | 3/1990 | European Pat. Off. . |
| 0366136A1 | 5/1990 | European Pat. Off. . |
| 2259625 | 3/1993 | United Kingdom . |
| WO80/01977 | 9/1980 | WIPO . |
| WO90/16131 | 12/1990 | WIPO . |
| WO91/20155 | 12/1991 | WIPO . |

OTHER PUBLICATIONS

S. F. Wu, et al., "A Differential Method for Simultaneous Estimation of Rotation, Change of Scale and Translation", Signal Processing: Image Communication 2 (1990), pp. 69–80.
K. Uomori et al., "Electronic Image Stabilization System for Video Cameras and VCRs", SMPTE Journal, Feb. 1992, No. 2, pp. 66–75.
A. N. Netravali et al., "Motion–Compensated Television Coding: Part I", The Bell System Technical Journal, vol. 58, No. 3, Mar. 1979, pp. 631–671.
B. F. Buxton et al., "Machine Perception of Visual Motion", GEC Journal of Research, vol. 3, No. 3, 1985, pp. 145–161.
A. V. Brandt, et al., "Recursive Motion Estimation Based on a Model of the Camera Dynamics", Signal Processing V: Theories and Applications, 1990, pp. 959–962.
G. A. Thomas, B. A., "Television Motion Measurement for Datv and Other Applications", The British Broadcasting Corporation, Research Department, Report No. 1987/11, Engineering Division, Sep. 1987, pp. 1–20.
Uomori et al., "Electronic Image Stabilization System for Video Cameras and VCRs", SMPTE Journal, pp. 66–75, Feb. 1992.
Rose, "Evaluation of a Motion Estimation Procedure for Low–Frame–Rate Aerial Images", ISCAS'88 Journal, 1988 IEEE International Symposium on Circuits and Systems vol. 3 of 3, pp. 2309–2312.

Primary Examiner—Victor R. Kostak
Attorney, Agent, or Firm—Kevin J. Fournier

[57] ABSTRACT

Studio camera position and motion may be derived from the camera image by separating out the background and deriving from a background having a number of areas of hue and/or brightness different from adjacent areas estimates of movement from one image to the next. The initial image is used as a reference and amended with predicted motion value. The amended image is compared with incoming images and the result used to derive translation and scale change information. Once the proportion of the reference image contained in an incoming image falls below a threshold a fresh reference image is adopted.

26 Claims, 2 Drawing Sheets

U.S. PATENT DOCUMENTS

| | | |
|---|---|---|
| 4,393,394 | 7/1983 | McCoy . |
| 4,739,401 | 4/1988 | Sacks et al. ............................. 348/700 |
| 4,823,184 | 4/1989 | Belmores-Sarabia et al. ......... 348/650 |
| 5,018,215 | 5/1991 | Nasr et al. ............................... 348/169 |
| 5,049,991 | 9/1991 | Niihara . |
| 5,073,819 | 12/1991 | Gates et al. ............................. 348/140 |
| 5,103,308 | 4/1992 | Watanabe ................................ 348/700 |
| 5,195,144 | 3/1993 | LeParquier et al. .................... 348/140 |
| 5,357,281 | 10/1994 | Ikeda et al. ............................... 348/17 |

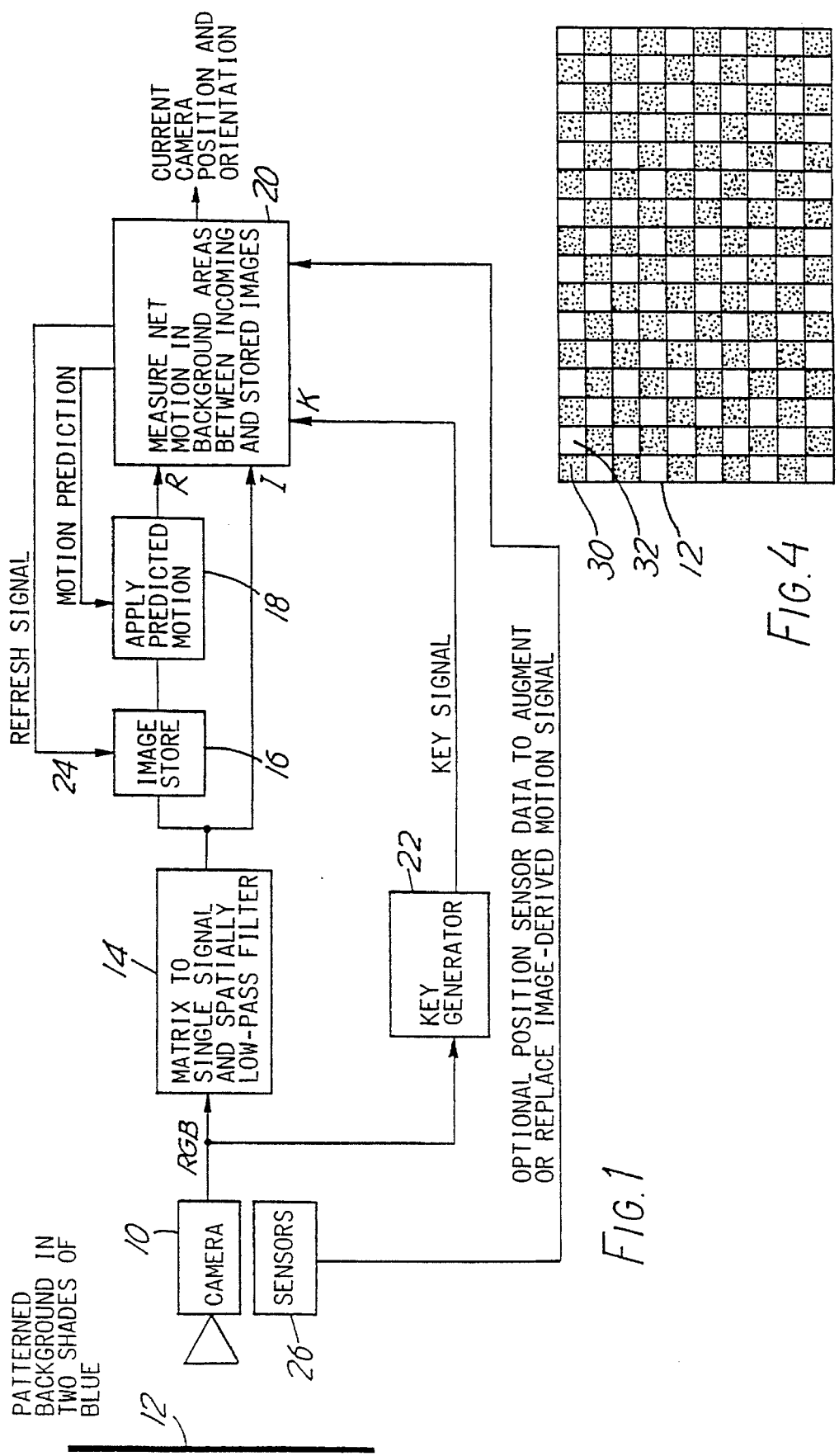
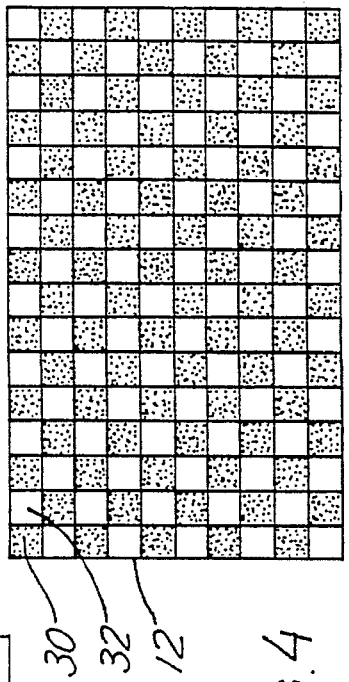
FIG. 1
FIG. 4

- MEASUREMENT POINT
- ADJACENT PIXEL $gc_x, gc_y$ HORIZONTAL AND VERTICAL LUMINANCE GRADIENTS IN CURRENT IMAGE $gr_x, gr_y$ HORIZONTAL AND VERTICAL LUMINANCE GRADIENTS IN REFERENCE IMAGE $g_t$ TEMPORAL LUMINANCE GRADIENT 5,502,482

DERIVATION OF STUDIO CAMERA POSITION AND MOTION FROM THE CAMERA IMAGE

FIELD OF THE INVENTION

This invention relates to the derivation of information regarding the position of a television camera from image data acquired by the camera.

BACKGROUND TO THE INVENTION

In television production, it is often required to video live action in the studio and electronically superimpose the action on a background image. This is usually done by shooting the action in front of a blue background and generating a 'key' from the video signal to distinguish between foreground and background. In the background areas, the chosen background image can be electronically inserted.

One limitation to this technique is that the camera in the studio cannot move, since this would generate motion of the foreground without commensurate background movement. One way of allowing the camera to move is to use a robotic camera mounting that allows a predefined camera motion to be executed, the same camera motion being used when the background images are shot. However the need for predefined motion places severe artistic limitations on the production process.

Techniques are currently under development that aim to be able to generate electronically background images that can be changed as the camera is moved so that they are appropriate to the present camera position. Thus a means of measuring the position of the camera in the studio is required. One way in which this can be done is to attach sensors to the camera to determine its position and angle of view; however the use of such sensors is not always practical.

The problem being addressed here is a method to derive the position and motion of the camera using only the video signal from the camera. Thus it can be used on an unmodified camera without special sensors.

DESCRIPTION OF PRIOR ART

The derivation of the position and motion of a camera by analysis of its image signal is a task often referred to as passive navigation; there are many examples of approaches to this problem in the literature, the more pertinent of which are as follows:

1. Brandt et al. 1990. Recursive motion estimation based on a model of the camera dynamics.

2. Brandt, A., Karmann, K., Lanser, S. Signal Processing V: Theories and Applications (Ed. Torres, L. et al.), Elsevir, pp. 959–962, 1990.

3. Buxton et al 1985 Machine perception of visual motion. Buxton, B. F., Buxton, H., Murray, D. W., Williams, N. S. GEC Journal of Research, Vol. 3 No. 3, pp. 145–161.

4. Netravali and Robbins 1979 Motion-compensated television coding: Part 1. Netravali, A. N., Robbins, J. D. Bell System Technical Journal Vol. 58. No. 3, Mar. 1979, pp. 631–670.

5. Thomas 1987 Television motion measurement for DATV and other applications. Thomas, G. A. BBC Research Department Report No. 1987/11.

6. Uomori et al. 1992 Electronic image stabilisation system for video cameras and VCRs. Uomori, K., Morimura, A., Ishii, J. SMPTE Journal, Vol. 101 No. 2, pp. 66–75, Feb. 1992.

7. Wu and Kittel 1990 Wu, S. F., Kittel, J. 1990. A differential method for simultaneous estimation of rotation, change of scale and translation. Signal Processing: Image Communication 2, Elsevier, 1990, pp. 69–80.

For example, if a number of feature points can be identified in the image and their motion tracked from frame to frame, it is possible to calculate the motion of the camera relative to these points by solving a number of non-linear simultaneous equations [Buxton et al. 1985]. The tracking of feature points is often achieved by measuring the optical flow (motion) field of the image. This can be done in a number of ways, for example by using an algorithm based on measurements of the spariotemporal luminanee gradient of the image [Netraveli and Robbins 1979].

A similar method is to use Kalman filtering techniques to estimate the camera motion parameters from the optical flow field and depth information [Brandt et al; 1990].

However, in order to obtain reliable (relatively noise-free) information relating to the motion of the camera, it is necessary to have a good number of feature points visible at all times, and for these to be distributed in space in an appropriate manner. For example, if all points are at a relatively large distance from the camera, the effect of a camera pan (rotation of the camera about the vertical axis) will appear very similar to that of a horizontal translation at right angles to the direction of view. Points at a range of depth are thus required to distinguish reliably between these types of motion.

Simpler algorithms exist that allow a sub-set of camera motion parameters to be determined, while placing less constraints on the scene content. For example, measurement of horizontal and vertical image motions such a those caused by camera panning and tilting can be measured relatively simply for applications such as the steadying of images in hand-held cameras [Uomori et al. 1992].

SUMMARY OF THE INVENTION

In order to derive all required camera parameters (three spatial coordinates, pan and tilt angles and degree of zoom) from analysis of the camera images, a large number of points in the image would have to be identified and tracked. Consideration of the operational constraints in a TV studio suggested that providing an appropriate number of well-distributed reference points in the image would be impractical: markers would have to be placed throughout the scene at a range of different depths in such a way that at a significant number were always visible, regardless of the position of the camera or actors.

We have appreciated that measurements of image translation and scale change are relatively easy to make; from these measurements it is easy to calculate either 1. pan, tilt and zoom under the assumption that the camera is mounted on a fixed tripod: the scale change is a direct indication of the amount by which the degree of camera zoom has changed, and the horizontal and vertical translation indicate the change in pan and tilt angles; or 2. horizontal and vertical movement under the assumption that the camera is mounted in such a way that it can move in three dimensions (but cannot pan or tilt) and is looking in a direction normal to a planar background:

the scale change indicates the distance the camera has moved along the optical axis and the image translation indicates how far the camera has moved normal to this axis.

This approach does not require special markers or feature points in the image, merely sufficient detail to allow simple estimation of global motion parameters. Thus it should be able to work with a wide range of picture material. All that is required is a measurement of the initial focal length (or angle subtended by the field of view) and the initial position and angle of view of the camera.

The invention is defined by the independent claims to which reference should be made. Preferred features are set out in the dependent claims.

The approach described may be extended to more general situations (giving more freedom on the type of camera motion allowed) if other information such as image depth could be derived [Brandi et al. 1990]. Additional information from some sensors on the camera (for example to measure the degree of zoom) may allow more flexibility.

In order to allow the translation and scale change of the image to be measured, there must be sufficient detail present in the background of the image. Current practice is usually based upon the use of a blue screen background, to allow a key signal to be generated by analysing the RGB values of the video signal. Clearly, a plain blue screen cannot be used if camera motion information is to be derived from the image, since it contains no detail. Thus it will be necessary to use a background that contains markings of some sort, but is still of a suitable form to allow a key signal to be generated.

One form of background that is being considered is a 'checkerboard' of squares of two similar shades of blue, each closely resembling the blue colour used at present. This should allow present keying techniques to be used, while providing sufficient detail to allow optical flow measurements to be made. Such measurements could be made on a signal derived from an appropriate weighted sum of RGB values designed to accentuate the differences between the shades of blue.

The key signal may be used to remove foreground objects from the image prior to the motion estimation process. Thus the motion of foreground objects will not confuse the calculation.

FIG. 1 shows in block schematic form the basic arrangement of a camera motion estimator system embodying the invention;

FIG. 4 shows a checkerboard background.

DESCRIPTION OF BEST MODE

Figure 2:
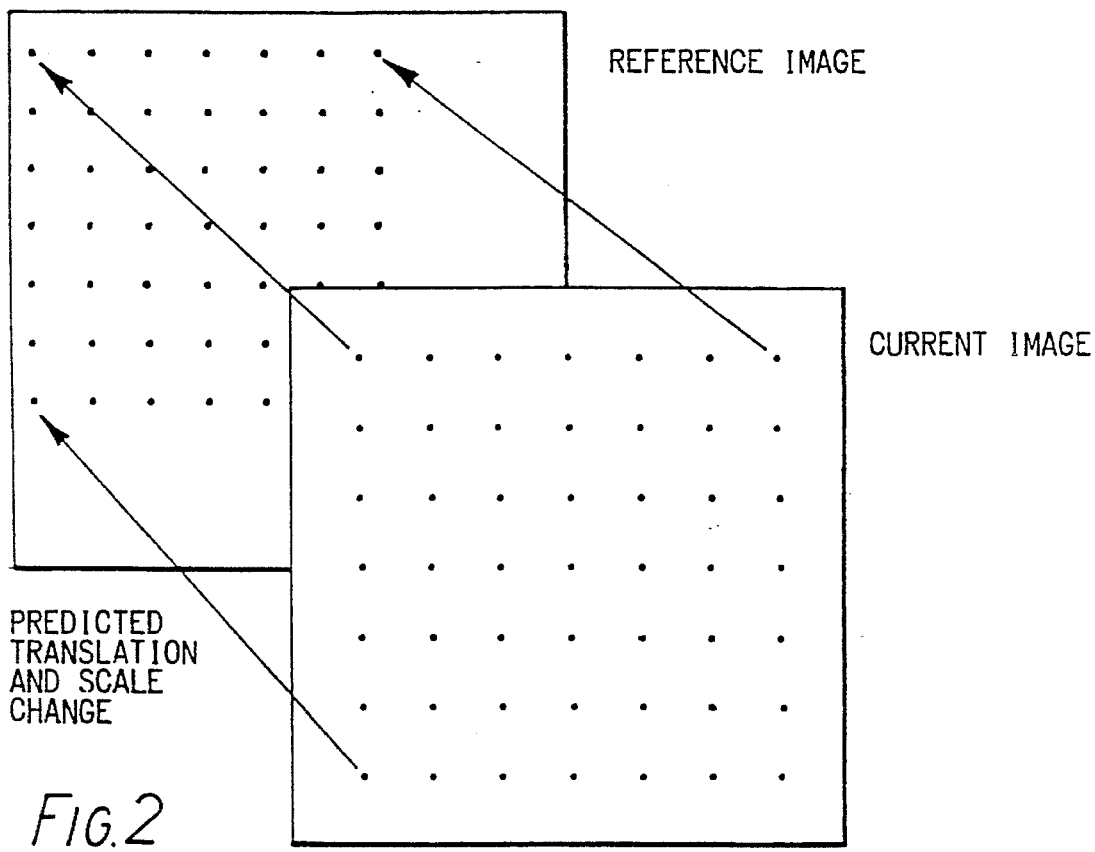
FIG. 2 illustrates the relationship of measurement points in current and reference images.

The algorithm chosen for measuring global translation and scale change must satisfy the following criteria:

1. The chosen algorithm cannot be too computationally intensive, since it must run in real-time;
2. It must be capable of highly accurate measurements, since measurement errors will manifest themselves as displacement errors between foreground and background;
3. Measurement errors should not accumulate to a significant extent as the camera moves further away from its starting point.

Embodiment: Motion Estimation Followed by Global Motion Parameter Determination

An example of one type of algorithm that could be used is one based on a recursive spario-temporal gradient technique described in reference 4 [Netravali and Robbins 1979]. This kind of algorithm is known to be computationally efficient and to be able to measure small displacements to a high accuracy. Other algorithms based on block matching described in reference 6 [Uomori et al. 1992] or phase correlation described in reference 5 [Thomas 1987] may also be suitable.

The algorithm may be used to estimate the motion on a sample-by-sample basis between each new camera image and a stored reference image. The reference image is initially that viewed by the camera at the start of the shooting, when the camera is in a known position. Before each measurement, the expected translation and scale change is predicted from previous measurements and the reference image is subject to a translation and scale change by this estimated amount. Thus the motion estimation process need only measure the difference between the actual and predicted motion.

The motion vector field produced is analyzed to determine the horizontal and vertical displacement and scale change. This can be done by selecting a number of points in the vector field likely to have accurate vectors (for example in regions having both high image detail and uniform vectors). The scale change can be determined by examining the difference between selected vectors as a function of the spatial separation of the points. The translation can then be determined from the average values of the measured vectors after discounting the effect of the scale change. The measured values are added to the estimated values to yield the accumulated displacement and scale change for the present camera image.

More sophisticated methods of analysing the vector field could be added in future, for example in conjunction with means for determining the depth of given image points, to extend the flexibility of the system.

As the accumulated translation and scale change get larger, the translated reference image will begin to provide a poor approximation to the current camera image. For example, if the camera is panning to the right, picture material on the right of the current image will not be present in the reference image and so no motion estimate can be obtained for this area. To alleviate this problem, once the accumulated values exceed a given threshold the reference image is replaced by the present camera image. Each time this happens however, measurement errors will accumulate.

All the processing will be carried out on images that have been spatially filtered and subsampled. This will reduce the amount of computation required, with no significant loss in measurement accuracy. The filtering process also softens the image; this is known to improve the accuracy and reliability of gradient-type motion estimators. Further computational savings can be achieved by carrying out the processing between alternate fields rather than for every field; this will reduce the accuracy with which rapid acceleration can be tracked but this is unlikely to be a problem since most movements of studio cameras tend to be smooth.

Software to implement the most computationally-intensive pans of the processing has been written and benchmarked, to provide information to aid the specification and design of the hardware accelerator. The benchmarks showed that the process of filtering and down-sampling the incoming images is likely to use over half of the total computation time.

Embodiment 2: Direct Estimation of Global Motion Parameters An alternative and preferred method of determining global translation and scale change is to derive them directly from the video signal. A method of doing this is described in reference 7 by [Wu and Kittel 1990]. We have extended this method to work using a stored reference image and to use the predicted motion values as a staging point. Furthermore, the technique is applied only at a sub-set of pixels in the image, that we have termed measurement points, in order to reduce the computational load. As in the previous embodiment the RGB video signal is matrixed to form a single-component signal and spatially low-pass filtered prior to processing. As described previously, only areas identified by a key signal as background are considered.

The method is applied by considering a number of measurement points in each incoming image and the corresponding points in the reference image, displaced according to the predicted translation and scale change. These predicted values may be calculated, for example, by linear extrapolation of the measurements made in the preceding two images. The measurement points may be arranged as a regular array, as shown in FIG. 2. A more sophisticated approach would be to concentrate measurement points in areas of high luminanee gradient, to improve the accuracy when a limited number of points are used. We have found that 500–1000 measurement points distributed uniformly yields good results. Points falling in the foreground areas (as indicated by the key signal) are discarded, since it is the motion of the background that is to be determined.

Figure 3:
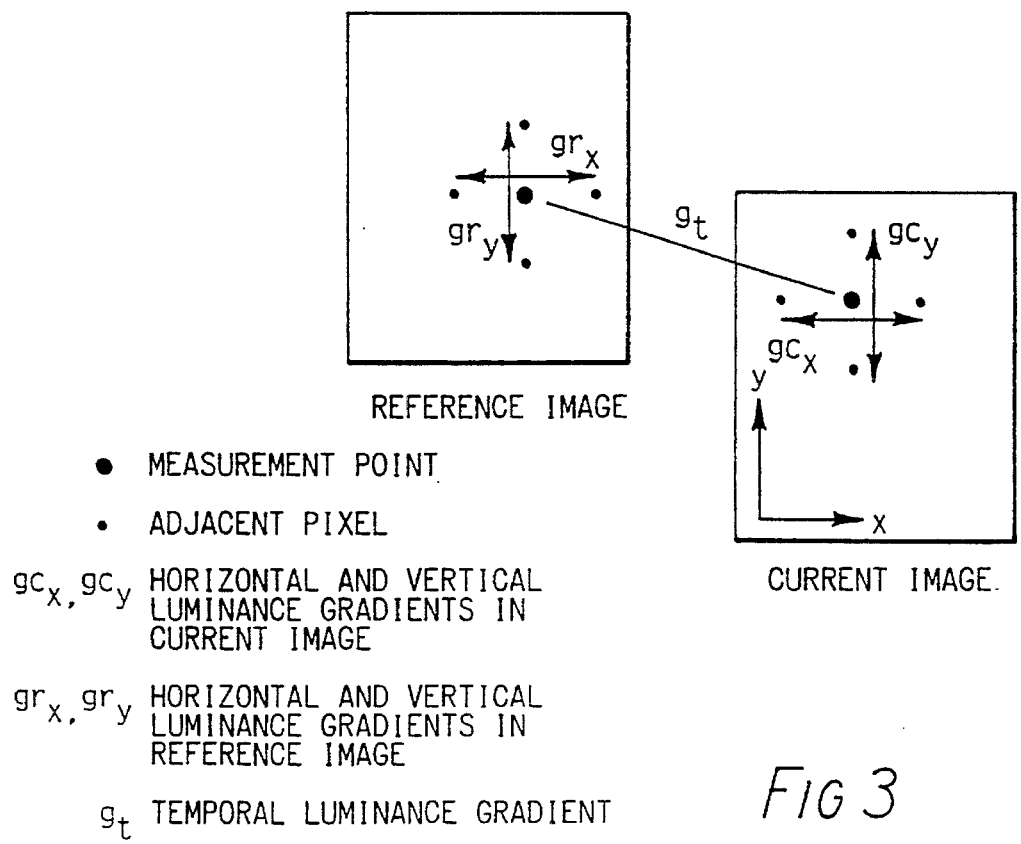
FIG. 3 is a schematic view showing the displacement of a given measurement point from a reference image to the current image.

At each measurement point, luminance gradients are calculated as shown in FIG. 3. These may be calculated, for example, by simply taking the difference between pixels either side of the measurement point. Spatial gradients are also calculated for the corresponding point in the reference image, offset by the predicted motion. Sub-pixel interpolation may be employed when calculating these values. The temporal luminanee gradient is also calculated; again sub-pixel interpolation may be used in the reference image. An equation is formed relating the measured gradients to the motion values as follows:

Gradients are (approximately) related to displacement and scale changes by the equation $$g_x X + g_y Y + (Z-1).(g_x x + g_y y) = g_t$$

where $g_x = (gr_x + gc_x)/2$ $g_y = (gr_y + gc_y)/2$ are the horizontal and vertical luminance gradients averaged between the two images:

$gc_x$, $gc_y$ are horizontal and vertical luminance gradients in current image;

$gr_x$, $gr_y$ are horizontal and vertical luminance gradients in reference image; and $g_t$ is the temporal luminance gradient.

X and Y are the displacements between current and reference image and Z is the scale change (over and above those predicted).

An equation is formed for each measurement point and a least-squares solution is calculated to obtain values for X, Y, and Z.

Derivation of the equation may be found in reference 7 [Wu and Kinel 1990] (this reference includes the effect of image rotation; we have omitted rotation since it is of little relevance here as studio cameras tend to be mounted such that they cannot rotate about the optic axis).

The set of simultaneous linear equations derived in this way (one for each measurement point) is solved using a standard least-squares solution method to yield estimates of the difference between the predicted and the actual translation and scale change. The calculated translation values are then added to the predicted values to yield the estimated translation between the reference image and the current image.

Similarly, the calculated and predicted scale changes are multiplied together to yield the estimated scale change. The estimated values thus calculated are then used to derive a prediction for the translation and scale change of the following image.

As described earlier, the reference image is updated when the camera has moved sufficiently far away from its initial position. This automatic refreshing process may be triggered, for example, when the area of overlap between the incoming and reference image goes below a given threshold. When assessing the area of overlap, the key signal needs to be taken account of, since for example an actor who obscured the left half of the background in the reference image might move so that he obscures the right half, leaving no visible background in common between incoming and reference images. One way of measuring the degree of overlap is to count the number of measurement points that are usable (ie. that fall in visible background areas of both the incoming and reference image). This number may be divided by the number of measurement points that were usable when the reference image was first used to obtain a measure of the usable image area as a fraction of the maximum area obtainable with that reference image. If the initial number of usable points in a given reference image was itself below a given threshold, this would indicate that most of the image was taken up with foreground rather than background, and a warning message should be produced.

It can also be advantageous to refresh the reference image if the measured scale change exceeds a given range (eg, if the camera zooms in a long way). Although in this situation the number of usable measurement points may be very high, the resolution of the stored reference image could become inadequate to allow accurate motion estimation.

When the reference image is updated, it can be retained in memory for future use, together with details of its accumulated displacement and scale change. When a decision is made that the current reference image is no longer appropriate, the stored images can be examined to see whether any of these gave a suitable view of the scene. This assessment can be carried out using similar criteria to those explained above. For example, if the camera pans to the left and then back to its starting position, the initial reference image may be re-used as the camera approachis this position. This ensures that measurements of camera orientation made at the end of the sequence will be as accurate as those made at the beginning.

Referring back to FIG. 1, apparatus for putting each of the two motion estimation methods into practice is shown. A camera 10, derives a video signal from the background 12 which, as described previously, may be patterned in two tones as shown in FIG. 4. The background cloth shown in FIG. 4 shows a two-tone arrangement of squares. Squares 30 of one tone are arranged adjacent sequences 32 of the other tone. Shapes other than squares may be used and it is possible to use more than two different tones. Moreover, the tones may differ in both hue and brightness or in either hue or brightness. At present, it is considered preferable for the brightness to be constant as variations in brightness might show in the final image.

Although the colour blue is the most common for the backcloth other colours, for example, green or orange are sometimes used when appropriate. The technique described is not peculiar to any particular background colour but requires a slight variation in hue and/or brightness between a number of different areas of the background, and that the areas adjacent to a given area have a brightness and/or hue different from that of the given area. This contrast enables motion estimation from the background to be performed.

Red, green and blue (RGB) colour signals formed by the camera are matrixed into a single colour signal and applied to a spatial low-pass filter (at 14). The low-pass output is applied to an image store 16 which holds the reference image data and whose output is transformed at 18 by applying the predicted motion for the image. The motion adjusted reference image data is applied, together with the low-pass filtered image to a unit 20 which measures the net motion in background areas between an incoming image at input I and a stored reference image at input R. The unit 20 applies one of the motion estimation algorithms described. The net motion measurement is performed under the control of a key signal K derived by a key generator 22 from the unfiltered RGB output from the camera 10 to exclude foreground portions of the image from the measurement. The motion prediction signal is updated on the basis of previous measured motion thus ensuring that the output from the image store 16 is accurately interpolated. When, as discussed previously, the camera has moved sufficiently away from its initial position a refresh signal 24 is sent from the net motion measurement unit 20 to the image store 16. On receipt of the refresh signal 24 a fresh image is stored in the image store and used as the basis for future net motion measurements.

The output from the net motion measurement unit 20 is used to derive an indication of current camera position and orientation as discussed previously.

Optionally, sensors 26 mounted on the camera can provide data to the net motion measurement unit 20 which augment or replace the image-derived motion signal.

The image store 16 may comprise a multi-frame store enabling storage of previous reference images as well as the current reference image.

The technique described can also be applied to image signals showing arbitrary picture material instead of just the blue background described earlier. If objects are moving in the scene, these can be segmented out by virtue of their motion rather than by using a chroma-key signal. The segmentation could be performed, for example, by discounting any measurement points for which the temporal luminanee gradient (after compensating for the predicted background motion) was above a certain threshold. More sophisticated techniques for detecting motion relative to the predicted background motion can also be used.

It will be understood that the techniques described may be implemented either by special purpose digital signal processing equipment, by software in a computer, or by a combination of these methods. It will also be clear that the technique can be applied equally well to any television standard.

I claim:

1. A method of measuring the translation and scale change in a sequence of video images, the method comprising:

storing a first image in said sequence to form a stored image;

forming a prediction of the translation and scale change from said stored image to a further image in said sequence;

transforming said stored image by said prediction of the translation and scale change to form a transformed first image;

comparing a further image in said sequence with said transformed first image;

deriving measurements of translation and scale change between said stored image and said further image from said comparison and said prediction; and replacing said first image with a new incoming image when the image area common to both said first image and incoming image falls below a given proportion of the whole image area of said incoming image.

2. The method of claim 1, wherein only the background areas of said video images are used in the measurement of translation and scale change.

3. The method of claim 2, wherein a signal is used to separate foreground and background and said signal is derived using chroma-key techniques.

4. The method of claim 2, wherein a signal is used to separate foreground and background portions of the images and said signal is derived using motion detection methods to identify objects moving with a different motion from that predicted for the background.

5. The method of claim 1, wherein:

each image is a single-component signal derived from a camera viewing a scene containing a background of near-uniform color;

said background is divided into a plurality of areas each having a hue and/or brightness different from the hue and/or brightness of adjacent areas to allow the generation of a key signal by chroma-key techniques; and wherein said single-component signal is formed from a three-component camera signal so to accentuate differences in hue and/or brightness of individual areas of said background to enable motion estimation.

6. A method for measuring the translation and scale change in a sequence of video images of a camera signal derived by a camera, comprising:

storing a first image of said sequence to form a stored image said image comprising a single component signal derived by a camera viewing a scene containing a background of near-uniform color, and said background being divided into a plurality of areas each having a hue and/or brightness different from the hue and/or brightness of adjacent areas to allow generation of a key signal by chroma-key techniques;

forming said single-component signal from said camera signal so as to accentuate differences in hue and/or brightness of individual areas of the background to enable motion estimation;

forming a prediction of the translation and scale change from said stored image to a further image in said sequence;

transforming said stored image by said prediction of the translation and scale change to form a transformed first image;

comparing a further image in said sequence with said transformed first image; and deriving measurements of translation and scale change between said stored image and said further image from said comparison and said prediction.

7. The method of claim 6, wherein said background is divided into a plurality of areas, each area having one of two hues and/or brightnesses.

8. The method of claim 6, wherein said areas of the background are square.

9. The method of claim 1 or 6, wherein said translation and scale change are predicted by the computation of a number of simultaneous equations each of which relate said translation and scale change to spatial and temporal gradients at a point in the reference image and which are solved to yield a least-squares solution for the motion parameters.

10. The method of claim 1 or 6, comprising:
   selecting a number of measurement points in said first image for motion estimation; and
   replacing said first image with a new incoming image when the number of measurement points which lie in areas of background visible in both said first image and a given incoming image falls below a given proportion of the total number of measurement points.

11. The method of claim 1 or 6, comprising replacing said first image if the scale change between an incoming image and the reference image exceeds a given factor.

12. The method of claim 1 or 6, comprising spatially prefiltering said first image prior to storage and comparison.

13. The method of claim 10, wherein said measurement points lie in a regular array in the image.

14. The method of claim 10 wherein said measurement points are chosen to lie at points of high spatial gradient.

15. The method of claim 1 or 6, comprising storing replaced reference images for later use.

16. Apparatus for measuring the translation and scale change in a sequence of video images, comprising:
   means for acquiring said sequence of images;
   storage means for storing a first image in said sequence to form a stored image;
   means for forming a prediction of the translation and scale change from said stored image to a further image in said sequence;
   means for transforming said stored image by said prediction of the translation and scale change to form a transformed first image;
   means for comparing said transformed first image with a further image in the sequence;
   means for deriving measurements of translation and scale change between said stored image and said further image from said comparison and said prediction; and
   means for replacing said first image with a new incoming image when the image area common to both said first image and incoming image falls below a given proportion of the whole image area of said incoming images.

17. The apparatus of claim 16, wherein said means for deriving operates only on the background areas of the images, said means for deriving comprising means for separating foreground and background portions of the images using motion techniques to identify objects moving with a different motion from that predicted for the background.

18. The apparatus of claim 16, wherein said means for deriving operates only on the background areas of the images, and said means for deriving comprising a key generator for generating a chroma-key to separate foreground and background.

19. The apparatus of claim 16, comprising:
   means for generating a single-component signal from a camera viewing a scene containing a background of near-uniform color, said background being divided into a plurality of areas each having a hue and/or brightness different from the hue and/or brightness of adjacent areas to allow the generation of a key signal by chroma-key techniques, and wherein the single-component signal is formed from a three-component camera signal so as to accentuate differences in hue and/or brightness of individual areas of the background to enable motion estimation.

20. Apparatus for measuring the translation and scale change in a sequence of video images derived by a camera, comprising:
   means for storing a first image of said sequence to form a stored image, said image comprising a single component signal derived by a camera viewing a scene containing a background of near-uniform color, said background being divided into a plurality of areas each having a hue and/or brightness different from the hue and/or brightness of adjacent areas to allow generation of a key signal by chroma-key techniques;
   means for forming said single-component signal from said camera signal so as to accentuate differences in hue and/or brightness of individual areas of the background to enable motion estimation;
   means for forming a prediction of the translation and scale change from said stored image to a further image in said sequence;
   means for transforming the stored image by a prediction of the translation and scale change to form a transformed first image;
   means for comparing a further image in said sequence with said transformed first image; and
   means for deriving, from said comparison and said prediction, measurements of translation of scale change between said stored image and said further image.

21. The apparatus of claim 19 or 20, wherein said background is divided into a plurality of areas each area having one or two hues and/or brightnesses.

22. The apparatus of claim 19 or 20, wherein said areas of the background are square.

23. The apparatus of claim 19 or 20, comprising:
   means for predicting the translation and scale change by the computation of a number of simultaneous equations each of which relate the translation and scale change to spatial and temporal gradients at a point in the first image and which are solved to yield a least-squares solution for the motion parameters.

24. The apparatus of claim 19 or 20, wherein the replacing means comprises:
   means for selecting a number of measurement points in the first image for motion estimation and for replacing the first image with a new incoming image when the number of measurement points which lie in areas of background visible in both the first image and a given incoming image falls below a given proportion of the total number of measurement points.

25. The apparatus of claim 16 or 20, comprising a spatial filter for filtering the images prior to storage and comparison.

26. The apparatus of claim 16 or 20, comprising a further storage means for storing a replaced reference image for future use.

* * * * *